United States Patent [19]

Inoue

[11] Patent Number: 4,551,381

[45] Date of Patent: Nov. 5, 1985

[54] COATING FILM HAVING ADHESIVENESS

[76] Inventor: Tetsuhiko Inoue, 2-37-8 Mukogaoka, Bunkyo-ku, Tokyo, Japan

[21] Appl. No.: 378,340

[22] Filed: May 14, 1982

[30] Foreign Application Priority Data

Mar. 29, 1982 [JP] Japan ..................................... 57-48847

[51] Int. Cl.[4] ............................................. B32B 5/16

[52] U.S. Cl. ..................................... 428/240; 428/246; 428/252; 428/283; 428/284; 428/286; 428/287; 428/327; 428/343; 428/354; 428/402; 428/403; 428/407

[58] Field of Search ............... 428/246, 282, 283, 284, 428/287, 290, 402, 403, 407, 286, 281, 240, 252, 343, 354, 327

[56] References Cited

U.S. PATENT DOCUMENTS

| | | | |
|---|---|---|---|
| 2,320,866 | 6/1943 | Hill | 428/407 |
| 3,400,036 | 9/1968 | Hemrick et al. | 428/281 |
| 3,547,674 | 12/1970 | Draper et al. | 428/284 |
| 3,620,366 | 11/1971 | Parkinson | 427/210 |
| 3,762,975 | 10/1973 | Iwasaki et al. | 428/284 |
| 3,975,563 | 8/1976 | Franer et al. | 428/143 |
| 4,256,805 | 3/1981 | Tugukuni et al. | 428/407 |
| 4,396,661 | 8/1983 | George et al. | 428/354 |

OTHER PUBLICATIONS

"Powder Coatins", vol. 61, No. 1, Jun. 1983, pp. 1-5.

"Encyclopedia of Chemical Technology", vol. 19, pp. 1-27, John Wiley & Sons, 1982.

*Primary Examiner*—James J. Bell
*Attorney, Agent, or Firm*—Parkhurst & Oliff

[57] ABSTRACT

A new and unique coating film comprises a basic layer of flexible fibrous material, a layer of liquid coating material applied thereon and a layer of powder coating material placed on the layer of liquid coating material. After the powder coating material is distributed, the obtained layer structure is subjected to heat treatment until the former is molten and it is then cured after cooling.

A method of preparing a coating film comprises applying liquid coating material onto a basic layer of fibrous material, uniformly distributing powder coating material over the surface of the layer of liquid coating material while the latter is still in a liquid state, and subjecting the obtained layer structure to heat treatment until the powder coating material is molten, after which it is cured after cooling. If colored liquid coating material is used, a layer of second transparent liquid coating material may be interposed between the colored liquid coating material and the powder coating material. Alternatively, a mixture of liquid and powder coating materials may be applied onto the basic layer of fibrous material. When a layer of colored liquid coating material is provided, it may be located between the fibrous material and the mixture of transparent liquid coating material and powder coating material.

9 Claims, 4 Drawing Figures

COATING FILM HAVING ADHESIVENESS

BACKGROUND OF THE INVENTION

1. Field of the Invention

The present invention relates to a coating film and more particularly to a coating film having excellent durability which is very easily used in the field.

Further, the present invention relates to a method of preparing this new and unique coating film.

2. Description of the Prior Art

Usually, coating material is classified into two types, that is, liquid coating material and powder coating material.

As is well known, the conventional liquid coating material has an advantageous feature that color control is easy to be effected, but it has drawbacks that during coating operations in the field a part of the coating material scatters away and moreover there is a necessity for using a solvent which is harmful for a human body.

On the other hand, the conventional powder coating material has an advantageous feature of excellent durability, but it has drawbacks that field operations with the conventional powder coating material require a complicated apparatus and takes a long period of time.

SUMMARY OF THE INVENTION

The present invention is intended to obviate the drawbacks of conventional liquid and powder coating materials as mentioned above and thereby provides a new coating in the form a coating film which has advantageous features of both the conventional liquid and powder coating materials. Thus, the new coating of the present invention is very easy to be operated in the field, its color control is easy to be effected, no spattering takes place during field operation, there is no necessity for a solvent which is harmful for an operator and it has excellent durability, good weather-proofness and other desirable properties.

Specifically, the coating film in accordance with the present invention is constructed of a basic thin layer of flexible fibrous material, a layer of liquid coating material applied onto the basic layer of fibrous material, said liquid coating material being partially impregnated into the layer of fibrous material, and a layer of powder coating material placed on the layer of liquid coating material. After the powder coating material is uniformly distributed over the surface of the layer of liquid coating material, the layer structure including the layer of powder coating material is subjected to heat treatment until the latter is molten and then cured after cooling.

As the fibrous material for the basic layer of the coating film, unwoven cloth, ordinary cloth, composite sheet material of unwoven cloth and plastic film adhesively secured to one another, flexible and tough paper or the like are preferably employed. Polyester fiber, polyamide fiber acrylic fiber, polyethylene fiber, polypropylene fiber or the like are preferably employed for unwoven cloth and ordinary cloth.

The thickness of the basic layer of fibrous material is preferably in the range of 10 to 300 microns. The basic layer of fibrous material less than 10 microns thick lacks in strength. On the contrary, the basic layer more than 300 microns thick lacks in flexibility.

It is an essential requirement that the liquid coating material used for the coating film of the present invention exhibits a certain flexibility after completion of curing. Specifically, urethane based coating material, phthalic acid based coating material, rubber based coating material or the like are acceptable as the liquid coating material for the coating film of the present invention. Polyvinyl based coating material or the like may be used with plasticizer mixed therein, as far as it is found that it exhibits flexibility by adding plasticizer therein.

The thickness of the layer of liquid coating material is usually in the range of 10 to 100 microns. A part of the liquid coating material is impregnated into the basic layer of fibrous material.

In order to apply liquid coating material onto the surface of a basic layer of fibrous material, many kinds of methods are available such as spraying, roll coating, flow coating, knife coating or the like.

It is another essential requirement that powder coating material used for the coating film of the present invention exhibits a certain flexibility after completion of curing. Specifically, ethylene vinyl acetate based coating material, polyurethane based coating material or the like are acceptable as powder coating materials.

The thickness of the layer of powder coating material is usually in the range of 20 to 200 microns. It is found that fusion takes place in the boundary area between both the layers of powder and liquid coating materials.

In order to heat the layer structure including the layer of powder coating material, it is preferable to use a drying oven, an infrared light beam heating apparatus, a hot air circulating type drying oven or the like. Usually, the drying oven is operated at a temperature in the range of 100° to 200° C. for 1 to 20 minutes. After the powder coating material is molten, it is subjected to natural cooling and thereby it is cured so that a continuous surface is produced.

To prepare the above-described coating film, there is proposed in accordance with the present invention a method comprising the steps of applying liquid coating material onto a basic layer of flexible fibrous material, uniformly distributing powder coating material over the surface of the layer of liquid coating material while the latter is still in a liquid state and subjecting the layer structure including the layer of powder coating material to heat treatment until the latter is molten and then cured after cooling.

As mentioned above, it is important that the liquid coating material has a nature of exhibiting a certain flexibility after completion of curing and it is partly impregnated into the basic layer of fibrous material and that the powder coating material has also a nature of exhibiting a certain flexibility after completion of curing.

When colored liquid coating material is used it is preferable that a layer of second transparent liquid coating material is placed between the layer of first colored liquid coating material and the layer of powder coating material, either after the former is cured or while it is still in a liquid state.

Further, there is proposed in accordance with a modified embodiment of the present invention a method of preparing a coating film in which a mixture of liquid and powder coating materials is applied onto the basic layer of fibrous material and thereafter the layer structure thus obtained is subjected to heat treatment in the same manner as described above.

When a layer of colored liquid coating material is provided, it is preferable that it is placed between the basic layer of fibrous material and a layer of a mixture of transparent liquid coating material and powder coating material.

Thus, it is an object of the present invention to provide a coating film which is very easy to be used in the field without any necessity for a solvent which is harmful to a human body.

It is an other object of the present invention to provide a coating film which is easily color controlled in the field.

It is another object of the present invention to provide a coating film which has excellent durability, good weather-proofness and other desirable properties.

It is still another object of the present invention to provide a coating film which is prepared at an inexpensive cost in a manufacturing factory.

Other objects and advantageous features of the present invention will be apparent from the reading of the following non-limiting description of various embodiments of the invention made in connection with the accompanying drawings.

DETAILED DESCRIPTION OF THE PREFERRED EMBODIMENTS

Figure 1:
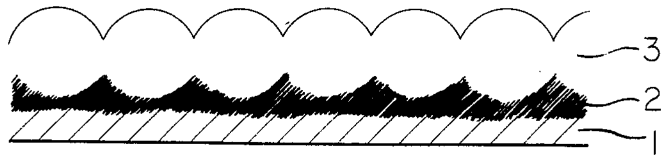
FIG. 1 is a partial sectional view of a coating film having adhesiveness prepared in accordance with a first embodiment of the present invention, shown in an enlarged scale.

Now the present invention will be described in more detail with reference to the accompanying drawings.

FIGS. 1 to 4 are sectional views of a coating film manufactured in accordance with four embodiments of the present invention respectively, wherein reference numeral 1 denotes a basic layer of fibrous material, reference numeral 2 denotes a layer of liquid coating material, reference numeral 3 denotes a layer of powder coating material, and reference numeral 4 denotes a layer of transparent liquid coating material.

A method of preparing a coating film in accordance with the first embodiment of the present invention comprises the steps of applying liquid coating material onto the surface of a thin basic layer of flexible fibrous material, said liquid coating material having a nature of exhibiting a certain flexibility after completion of curing and a part thereof being impregnated into the basic layer of fibrous material, uniformly distributing powder coating material over the surface of the layer of liquid coating while the latter is still in a liquid state, said powder coating material having a nature of exhibiting flexibility after completion of curing, and subjecting the layer of powder coating material to heat treatment until the latter is molten and then cured after cooling.

Again, the method in accordance with the first embodiment of the present invention will be described in greater detail below with reference to FIG. 1.

First, transparent or colored liquid coating material 2 is applied onto the surface of a basic layer of fibrous material 1 and a part of the former is impregnated into the latter. Then, powder coating material 3 is distributed over the layer of liquid coating material while the latter is still in a liquid state and the former is adhesively secured to the latter. Then, the layer of distributed powder coating material is heated in a drying oven or the like until it is molten to form a continuous layer of powder coating material.

Next, a method of preparing a coating film in accordance with the second embodiment of the present invention is a modification from the first one. Specifically, it comprises the steps of applying a first colored liquid coating material onto the surface of a basic layer of flexible fibrous material, said first liquid coating material having a nature of exhibiting a certain flexibility after completion of curing and a part thereof being impregnated into the basic layer of fibrous material, applying a second transparent liquid coating material onto the surface of the layer of the first liquid coating material after the latter is cured or while it is still in a liquid state, said second liquid coating material having also a nature of exhibiting a certain flexibility after completion of curing, uniformly distributing a powder coating material over the surface of the layer of the second liquid coating material while the latter is still in a liquid state, and then subjecting the layer of distributed powder coating material to heat treatment until the latter is molten and then cured after cooling.

It should be noted that the coating film prepared in accordance with the second embodiment has an excellent durability in comparison with the first embodiment.

Figure 2:
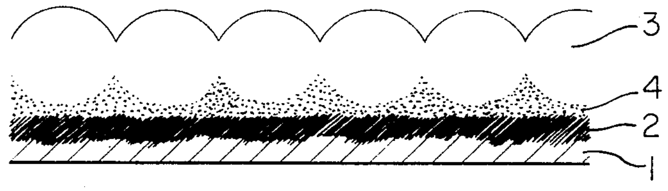
FIG. 2 is a partial sectional view of a coating film prepared in accordance ith a second embodiment of the present invention, shown in an enlarged scale.

Again, the method in accordance with the second embodiment of the present invention will be described with reference to FIG. 2.

As is apparent from the drawing, the layer of second liquid coating material 4 is interposed between the layer of first liquid coating material 2 and the layer of distributed powder coating material 3. The layer structure other than the foregoing is identical to that in the first embodiment as illustrated in FIG. 1.

Next, a method of preparing a coating film in accordance with the third embodiment of the present invention consists in that a mixture of liquid coating material and powder coating material uniformly dispersed into the former is applied onto a thin basic layer of flexible fibrous material so that a part of the mixture is impregnated into the basic layer and then the layer structure including the powder coating material is subjected to heating until the latter is molten and then it is cured after cooling, wherein both the liquid and powder coating materials have a nature of exhibiting a certain flexibility after completion of curing.

Thus, to practice the method in accordance with the third embodiment of the invention it is necessary to prepare a mixture of liquid and powder coating materials prior to applying the same onto the surface of a basic layer of fibrous material. The ratio of liquid coating material to powder coating material in the mixture is usually in the range of 0.5:1 to 1.5:1 in weight and preferably it is approximately 1:1 in weight.

Figure 3:
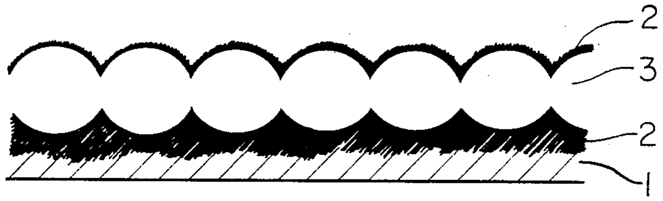
FIG. 3 is a partial sectional view of a coating film prepared in accordance with a third embodiment of the present invention, shown in an enlarged scale.

Again, the method in accordance with the third embodment will be described below with reference to FIG. 3.

As is apparent from the drawing, the mixture is applied onto the surface of a basic layer of fibrous material and thereafter a layer structure is obtained such that liquid coating material is uniformly coated over the respective particles of powder coating material. The layer structure other than the foregoing is identical to that in the first embodiment as illustrated in FIG. 1.

When the method in accordance with the third embodiment is practiced, it is found that an excellent coating film is produced just like in case of the first embodiment.

Next, a method of preparing a coating film in accordance with the fourth embodiment of the present invention is a modification from the third one. Specifically, it comprises the steps of applying a first colored liquid coating material onto the surface of a basic thin layer of flexible fibrous material, said first liquid coating material having a nature of exhibiting a certain flexibility after completion of curing and a part thereof being impregnated into the basic layer of fibrous material; applying a mixture of a second transparent liquid coating material and a powder coating material onto the surface of the layer of first liquid coating material after the latter is cured or while it is still in a liquid state, both of said second liquid coating material and powder coating material having also a nature of exhibiting a certain flexibility after completion of curing, respectively, and then subjecting the layer structure to heat treatment until the powder coating material becomes molten and then is cured after cooling.

It should be noted that the coating film prepared in accordance ith the fourth embodiment has a durability better than that obtained in accordance with the third embodiment.

Figure 4:
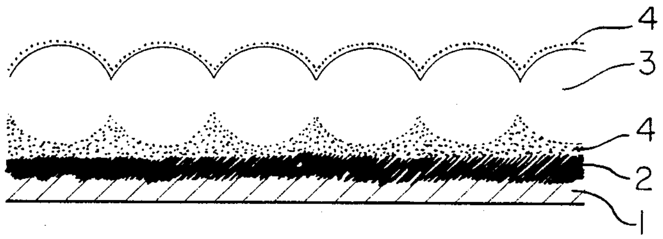
FIG. 4 is a partial sectional view of a coating film prepared in accordance with a fourth embodiment of the present invention, shown also in an enlarged scale.

Again, the method in accordance with the fourth embodiment of the present invention will be described with reference to FIG. 4.

As is apparent from the drawing, the layer of second transparent liquid coating material 4 is interposed beween the layer of first liquid coating material 2 and the layer of distributed powder coating material 3.

Now practical utilization of the coating film having adhesiveness in accordance with the present invention will be described below.

When the coating film of the invention is to be applied onto an object such as a wall of a building or the like, a suitable kind of adhesive is coated over the surface of the object and then the coating film is placed thereon under manual force of the like. Alternatively, an adhesive is coated over the rear surface of the coating film of the invention (that is, the rear surface of the basic layer of fibrous material) and then the coating film with the adhesive applied thereon is placed on the surface of the object under manual force or the like. In the latter case it is preferable that the coating film of the invention is previously coated with adhesive and the exposed working surface coated therewith is covered by means of a separator in a manufacturing factory but not in the field, because the layer structure thus prepared stands well for a long period of storage and moreover is convenient for the sake of transportation. The coating film products are transported to a predetermined place where field operation is to be conducted and then the coating film is placed over the surface of an object with the separator peeled off therefrom.

Advantageous features of the coating film of the invention will be mentioned as follows.

1. It is very easy to practice coating operation in the field using the coating film.

2. An excellent durability is ensured owing to the arrangement of a layer of powder coating material on the surface of the coating film.

3. It is easy to select a coating color by selecting a suitable kind of liquid coating material.

4. There is no danger of injuring a human body, because no coating material is thrown away or spattered during field operation and no solvent is used.

5. It is possible to reproduce exactly any uneven geometrical configuration of an object using a coating film of the invention, because the latter has an excellent flexibility and a high tensile strength given by a basic layer of fibrous material.

EXAMPLE

1. As an unwoven cloth for a basic layer of fibrous material the following product was employed
   - commercial name of product: Unisel
   - manufacturer of the same: Teijin Ltd.
   - Product No.: BT0403W
   - composition of material used: 70% of polyester fiber+30% of polyethylene fiber
   - thickness of basic layer: approximate 50 microns
   - color: pure white as seen under a beam of reflected light
   - characteristic features of basic layer: flexible film structure having a good permeability to air, composed of long fibers having an excellent tensile strength 2. As a liquid coating material the following product was employed.
   - manufacturer of product: Nippon Paint Co., Ltd.
   - material used: phthalic acid based coating material preferably used for painting a large machine or the like
   - color of product: red
   - solvent used: aromatic solvent (toluene, xylene or the like)

3. As a powder coating material the following product was employed.
   - commercial name of product: Regiband
   - manufacturer of the same: Bayer AG, West Germany
   - material used: ethylene vinyl acetate
   - particle size of product: 100 microns in average
   - color: transparent 4. As the second transparent liquid coating material the following product was employed.
   - manufacturer of product: Nippon Paint Co., Ltd.
   - material used: phthalic acid based coating material preferably used for painting a large machine or the like
   - color: transparent
   - solent used: aromatic solvent (toluene, xylene or the like)

5. Operating conditions for applying liquid coating onto an unwoven cloth are as follows.
   - The required coating material is prepared by diluting phthalic acid based coating material with a solvent at a ratio of 10 of the former to 3 of the latter. The diluted coating material is applied onto an unwoven cloth at a coating material supply rate of 120 g/min and an atomizing air flow rate of 200 l/min with the aid of a spray gun.

6. Powder coating material is sprayed and adhesively secured to a layer of a liquid coating material in the following manner.
   - Powder coating material is applied onto the surface of a layer of liquid coating material in the form of a fog of fine particles by means of a nozzle, while the liquid coating material is still in a liquid state.

After completion of spraying, excessive powder coating material is removed by air blowing.

7. Operating conditions for applying the second transparent liquid coating material onto the surface of a layer of first liquid coating material are the same as those as described in the preceding paragraph 5.

8. Mixing ratio of powder coating material to liquid coating material in weight is as follows.

1:1

9. The layer structure including a layer of powder coating material is subjected to heat treatment in conformity with the following conditions using the following apparatus.

Operating conditions: 140° C. and 5 min.

apparatus used: hot air circulating type heating oven operating at a constant temperature The inventor maufactured a number of coating films having adhesiveness in accordance with the four embodiments of the present invention as described above, using the aforesaid materials under the aforesaid operating conditions and conducted a variety of tests such as weather-o-meter test, chemical resisting property test, heat cycle test and others with the coating films adhesively placed onto a steel plate. After completion of the various tests it was found that the coating films of the invention had a more excellent durability than conventional ones as obtained by direct coating on a steel plate.

What is claimed is:

1. A composite sheet comprising a flexible thin fabric substrate, a first flexible continuous layer of a cured liquid coating material formed on one side of said fabric substrate and partially impregnated in said fabric substrate, a second flexible continuous layer of a cured resinous powder coating material formed on the first flexible layer, and an adhesive layer formed on the other side of said fabric substrate.

2. A composite sheet according to claim 1, wherein said fabric substrate has a thickness of about 10 to 300 microns, said first flexible layer has a thickness of about 10 to 100 microns, and said second flexible layer has a thickness of about 20 to 200 microns.

3. A composite sheet according to claim 1, further comprising a flexible layer of a cured transparent liquid coating material between said first and second flexible continuous layers.

4. A composite sheet according to claim 1, wherein said second flexible continuous layer on said first flexible layer is enclosed within a flexible layer of a cured transparent liquid coating material.

5. A composite sheet according to claim 1, wherein said fabric substrate comprises a non-woven fabric.

6. A composite sheet according to claim 1, further comprising a peelable separator covering said adhesive layer.

7. A composite sheet as claimed in claim 1, wherein said flexible thin fabric substrate is selected from the group consisting of unwoven cloth and woven cloth which are made of polyester fiber, polyamide fiber, acrylic fiber, polyethylene fiber or polypropylene fiber.

8. A composite sheet as claimed in claim 1, wherein said first flexible continuous layer of a cured liquid coating material is selected from the group consisting of urethane based coating material, phthalic acid based coating material, rubber based coating material and polyvinyl based coating material.

9. A composite sheet as claimed in claim 1, wherein said second flexible continuous layer of a cured resinous powder coating material is selected from the group consisting of ethylene vinyl acetate based coating material and polyurethane based coating material.

* * * * *